US006996573B2

(12) United States Patent  (10) Patent No.: US 6,996,573 B2
Syvanne  (45) Date of Patent: Feb. 7, 2006

(54) SCREENING OF DATA PACKETS IN A GATEWAY (75) Inventor: Tuomo Syvanne, Vantaa (FI)

(73) Assignee: Stonesoft Oy, Helsinki (FI)

( * ) Notice: Subject to any disclaimer, the term of this patent is extended or adjusted under 35 U.S.C. 154(b) by 272 days.

(21) Appl. No.: 09/976,780

(22) Filed: Oct. 12, 2001

(65) Prior Publication Data

US 2002/0095529 A1    Jul. 18, 2002

(30) Foreign Application Priority Data

Jan. 18, 2001    (FI)    ................................ 20010110

(51) Int. Cl.
G06F 17/30    (2006.01)
(52) U.S. Cl. .......................................... 707/102; 707/6
(58) Field of Classification Search ............... 707/1–10, 707/100–104.1, 200–205; 709/229, 217, 709/236, 253, 225, 226
See application file for complete search history.

(56) References Cited

U.S. PATENT DOCUMENTS 6,332,163 B1 * 12/2001 Bowman-Amuah ......... 709/231

FOREIGN PATENT DOCUMENTS

| EP | 0 909 072 A | 4/1999 |
| EP | 0 909 075 A1 | 4/1999 |
| EP | 1 006 701 A | 6/2000 |
| WO | WO 99/48261 | 9/1999 |
| WO | WO 00/60793 | 10/2000 |

OTHER PUBLICATIONS

Huitema, "IPv6: The New Internet Protocol", 1998, Prentice Hall, Inc., Upper Saddle River 270260, XP002313255, p. 10.

* cited by examiner

Primary Examiner—Mohammad Ali
(74) Attorney, Agent, or Firm—Ronald C. Fish, A Law Corporation (57) ABSTRACT

A method for processing data packets in a gateway element comprises the steps of: comparing a data packet to screening information comprising a set of rules, and processing a data packet according to a rule belonging to the set of rules, the header information of said data packet matching the header information of said rule. The method is characterized in that said screening information is hierarchically structured so that it comprises a first rule, which specifies first header information, and a subset of rules relating to said first rule, and in that in said step of comparing a data packet, said data packet is compared to said subset of rules only if the header information of the data packet matches the header information of the first rule. A gateway element, an arrangement, and a data structure comprising screening information are also presented.

3 Claims, 9 Drawing Sheets

SCREENING OF DATA PACKETS IN A GATEWAY

BACKGROUND OF THE INVENTION

1. Field of the Invention

The invention relates in general to information based on which data packets are screened in a network node. It further relates to processing data packets in a network node based on such information.

2. Description of Related Art

The public Internet is presently being used more and more for sensitive and mission critical communications. Since the basic mechanisms of the Internet were originally not designed with secrecy and confidentiality in mind, the Internet is an untrusted network. Skilled individuals can in many cases eavesdrop or divert communications, which requires the use of different kinds of security measures in order to use the Internet for sensitive communications.

The local networks of various organizations and enterprises are nowadays connected to the public Internet. To protect a local network, special gateway is usually used to connect the local network to a public network. This special gateway is often called a firewall and the purpose of a firewall is to prevent authorized access to the local network. Typically there is need to restrict access to a local network from a public network and/or to restrict access from the local network to the public network or further networks connected to the public network. On data packet level this means that data packets, which are entering and/or exiting a local network, are screened or filtered in a firewall. In addition to filtering data packets a gateway element may secure data packets transmitted between, for example, certain local networks. In this case the gateway is both a firewall and a VPN (Virtual Private Network) gateway.

Figure 1:
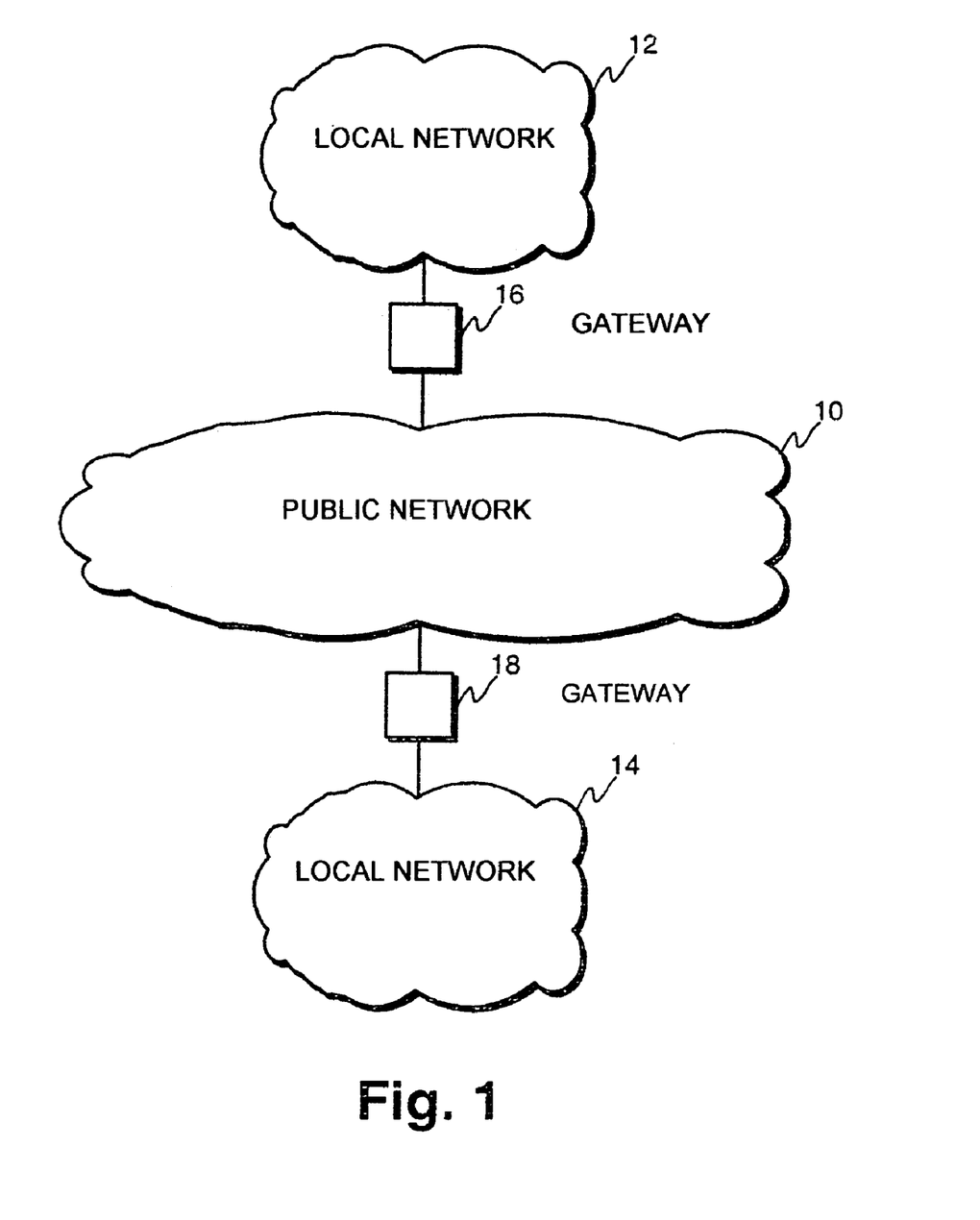
FIG. 1 illustrates two local networks connected to a public network via gateways.

FIG. 1 illustrates an example with a first local network 12, a second local network 14 and a public network 10. The public network may be, for example, the Internet. The local networks 12, 14 are connected to the public network 10 via gateway entities 16 and 18, respectively. A gateway element 16, 18 may be implemented as one network node (server) or as a cluster of nodes. Term gateway element is used in this description to refer to a network node or to a cluster of network nodes, where data packet screening is typically performed and which connects at least two networks (each network having at least one network node) to each other. A gateway element may be, for example, a firewall node, a firewall node provided with VPN functionality or a cluster of such nodes.

Figure 2:
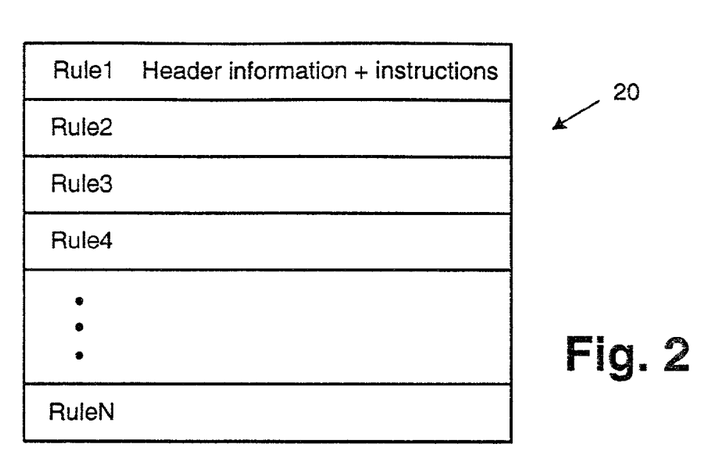
FIG. 2 illustrates a set of rules for screening data packets according to prior art.

The screening of data packets is usually done using information specifying at least allowed data packet headers and corresponding instructions for processing a data packet. This information is usually an ordered set of rules. FIG. 2 illustrates as an example a set 20 of rules, having a first rule Rule1, a second rule Rule2, and so forth. The order of the rules in the rule set typically defines the order in which a header of a data packet is compared to the rules. The instructions specified in the first rule, to which the header of a data packet matches, states the action to be carried out for said data packet. The rules are typically listed in a rule file in the order in which they are processed: a rule file thus typically comprises a sequence of rules Rule1, Rule2, ..., RuleN. The rule file is typically stored in a gateway element, for example in gateway element 16.

A typical format for the rules is the following: header information, action. The header information typically involves source address (src), destination address (dst) and protocol (prot) relating to a data packet, and a rule typically has the following form: src, dst, prot, action. This means that for a data packet, which has the indicated header information, the indicated action is carried out. Typically the action is 'drop' or 'accept', which means the data packet is discarded or allowed to proceed, correspondingly. As a data packet is processed, its header information is compared to the header information indicated by the rules; the rules are processed in the order defined by the ordered set. Typically the last rule in the ordered set of rules (e.g. RuleN in FIG. 2) is of the following form: any, any, any, drop. This means a data packet, whose header information does not match the header information indicated in any of the preceding rules, is discarded.

A problem in having an ordered set of rules is that when, for example, a new rule is added to the ordered set of rules, the position of the new rule has to be determined with care. Otherwise the effect of the rule may be not the desired effect. To find a correct position for a new rule may be difficult especially as the list of rules in a rule file may comprise a vast number of rules. Furthermore, a packet is typically compared to large number of rules before the rule to which it matches is found. In the worst case, a packet is compared to all rules and then discarded on the basis of the very last rule. This results in inefficient use of processing resources in a gateway element.

SUMMARY OF THE INVENTION

Object of the invention is to present a flexible method and arrangement for providing information for screening data packets. A further object is to present a method and arrangement for providing screening information where the effect of the rules may be easily determined. A further object is to present an efficient method for screening data packets.

Objects of the invention are achieved by using a hierarchical set of rules.

A method according to the invention is a method for processing data packets in a gateway element, said method comprises the steps of:
  comparing a data packet to screening information comprising a set of rules, and
  processing a data packet according to a rule belonging to the set of rules, the header information of said data packet matching the header information of said rule, and it is characterized in that
  said screening information is hierarchically structured so that it comprises a first rule, which specifies first header information, and a subset of rules relating to said first rule, and in that
  in said step of comparing a data packet, said data packet is compared to said subset of rules only if the header information of the data packet matches the header information of the first rule.

A gateway element according to the invention comprises means for storing screening information and
  means for processing data packets, said processing involving comparison of a data packet header to header information specified in said screening information, and it is characterized in that said means for processing data packets are arranged to compare header information of a data packet to screening information comprising a first rule, which specifies first header information, and a subset of rules relating to said first rule, and arrange to compare a data packet to said subset of rules only if the header information of the data packet matches the header information of the first rule.

An arrangement according to the invention comprises at least one gateway element and a database entity, and said at least one gateway element comprises means for storing information for screening data packets and means for processing data packets, said processing involving comparison of a data packet header to header information specified in said screening information, and said arrangement is characterized in that said database entity comprises means for providing information for screening data packets, said at least one gateway element further comprises means for receiving at least part of said information for screening data packets from said database entity, and said means for processing data packets are arranged to compare header information of a data packet to screening information comprising a first rule, which specifies first header information, and a subset of rules relating to said first rule, and arrange to compare a data packet to said subset of rules only if the header information of the data packet matches the header information of the first rule.

The invention further relates to a computer program comprising program code for performing all the steps of a method according to the invention when said program is run on a computer.

The invention relates also to a computer program product comprising program code means stored on a computer readable medium for performing a method according to the invention when said program product is run on a computer.

A data structure according to the invention comprises screening information, and it is characterized in that said screening information is hierarchically structured so that it comprises a first rule, which specifies first header information, and a subset of rules relating to said first rule, said first header information being common to said rules belonging to said subset of rules.

Hierarchical structure of screening information refers to organizing rules into groups of rules, where each rule belonging to a certain group has a certain part of the header information common with the other rules belonging to the same group. The common part of header information is placed in one rule, and the group of rules is made subordinate to this one rule. Typically the screening information is organized by a person or entity responsible for the management of a gateway element.

Hierarchical structure of screening information clarifies the screening information, as instructions for processing certain data packets that have something in common in their header information are grouped into sets of subrules. Therefore modification of screening information is easier, when instead of a plain ordered set of rules hierarchical rules are used. Furthermore, hierarchical rules allow more efficient processing of data packets. If the partial header information specified in a first rule does not match a data packet, there is no need to compare the header information of that data packet to the header information specified in subrules of said first rule. Typically the order of rules is decisive in hierarchically structured screening information, and therefore there may be a number of sets of subrules having the same common header information in, for example, a file containing screening information.

Additionally, a feature of some embodiments of the invention enable distributing rights to modify rules. That is, a local entity other than an entity authorized to modify all rules may be given right to modify a subset of rules.

The appended dependent claims describe some preferred embodiments of the invention.

BRIEF DESCRIPTION OF THE DRAWING

The invention is now described in more detail with reference to the accompanying drawing, where.

DETAILED DESCRIPTION OF THE INVENTION

FIGS. 1 and 2 are discussed in more detail above in connection with the prior art description.

Figure 3A:
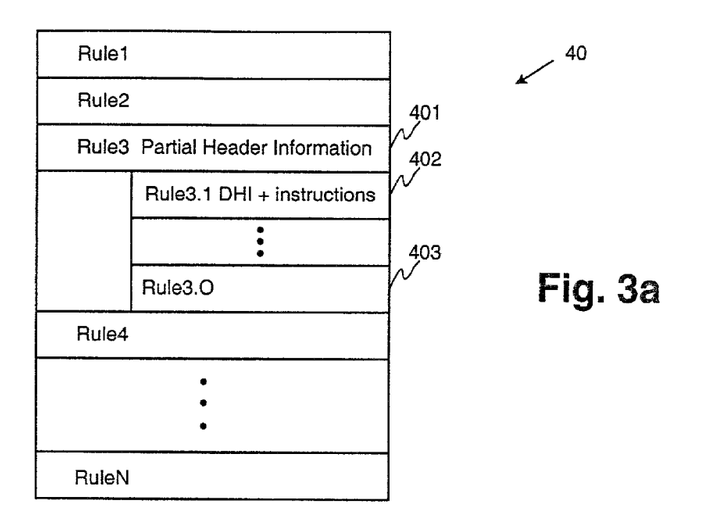
FIG. 3 illustrates screening information in accordance with the invention.
Figure 3B:
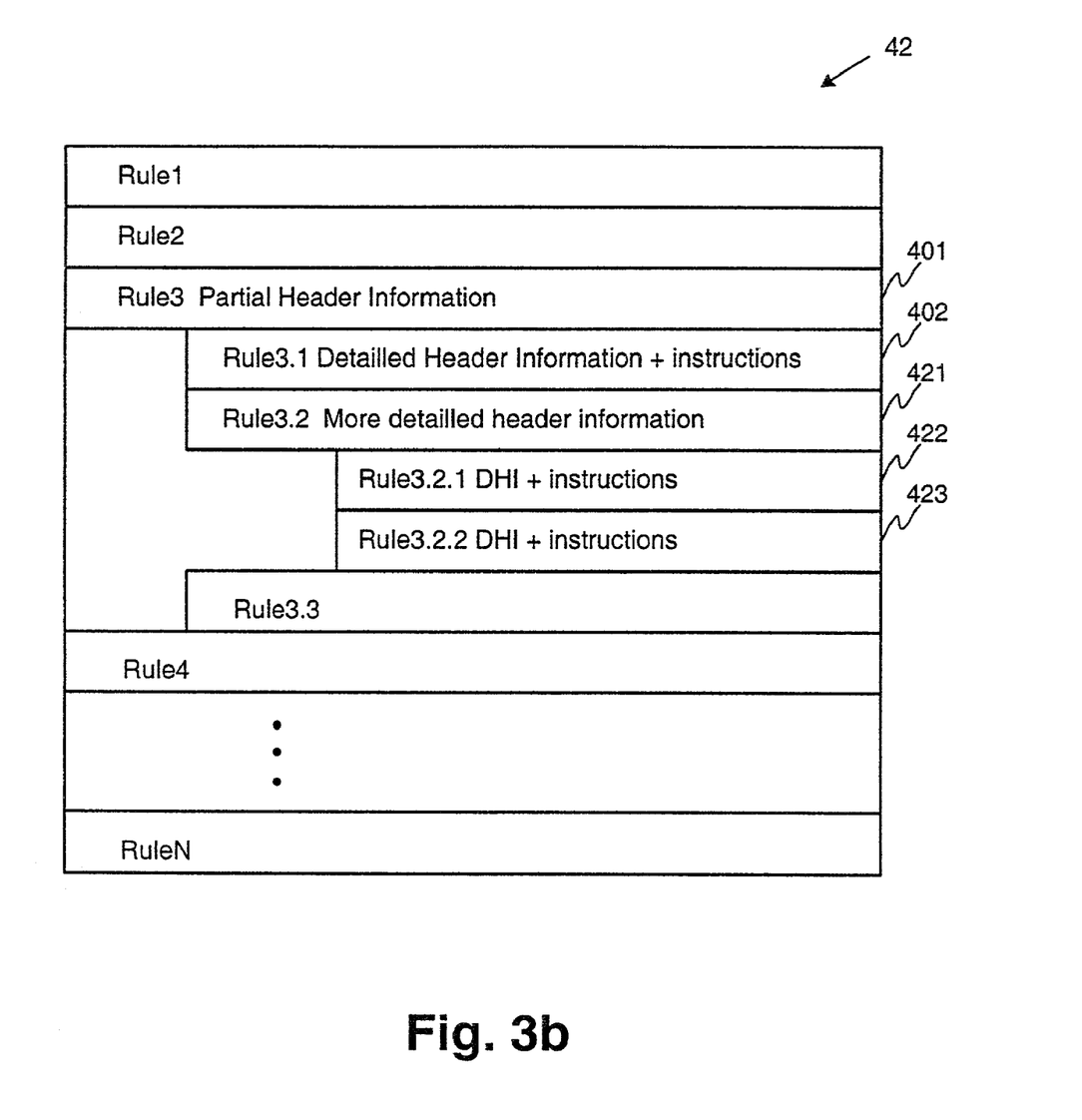

FIG. 3a illustrates screening information 40, which involves hierarchical rules, in accordance with the invention. Screening information 40 illustrated in FIG. 3 comprises a rule 401, in FIG. 3 this rule is Rule3 as an example, which specifies only partial header information. This rule 401 has subordinate rules 402, 403 (in FIG. 3 rules from Rule3.1 to Rule3.0), which comprise more header information. The instruction part in Rule3 gives instruction to proceed to the subordinate rules, either implicitly (absence of instruction part) or explicitely. The header information in a subordinate rule 402, 403, either alone or together with the partial header information presented in rule 401, specifies that header information of a data packet, which results in a match and causes the data packet to be processed in accordance with the instructions specified in the subordinate rule.

If the partial header information specified in rule 401 does not match a data packet, there is no need to compare the header information of that data packet to the header information specified in subrules 402, 403. Thus, hierarchical rules allow more efficient processing of data packets.

Screening information may comprise any number of rules having subordinate rules. A first set of subordinate rules may relate, for example, to data packets relating to coming email messages. A second set of subordinate rules may relate, for example, to data packets relating to data packets from a public network to a WWW server placed behind a gateway element. Consider an example, where a WWW server and a mail server are placed in a separate network DMZ, which is separated both from a local network and from the public network via a gateway element. It is possible that both these sets of subrules are subordinate to a certain rule. This certain rule may specify, for example, that the subrules are considered when a source of a data packet may be any source, destination is DMZ, and protocol may be any protocol. In the subrules relating to email, the destination may be further specified to be the address of the mail server, and in the subrules relating WWW, the destination in the subrules may be specified to be the address of the WWW server. In addition, as it is possible that the mail server is managed by a different entity/person than the WWW server, it is possible that the subrules relating to the mail server are modifiable by a first entity, and the subrules relating to the WWW server are modifiable by a second entity. The mail server and the WWW server are used above as clarifying examples; the subrules may relate to any protocols, servers or network addresses. Also the header information may be divided between a rule and its subrules in any suitable way.

Furthermore, a set of subrules may be subordinate to a subrule. In other words, there may be a subrule inside a subrule. An example of this is given in FIG. 3b, where screening information 42 is illustrated. Rules 3 and 3.1 (marked with reference numbers 401 and 402) are similar in screening information 40 and 42. In screening information 42 Rule 3.2, which itself is a subrule of Rule 3, has two subrules. Rule 3.2 (marked with reference number 421) specifies more detailed header information than Rule 3, and this header information is common to Rules 3.2.1. and 3.2.2. Typically it is different from the header information specified in Rule 3.1. The parts of the header information, which are different for Rules 3.2.1 and 3.2.2 (marked with reference numbers 422 and 423), are specified in these rules.

Figure 4:
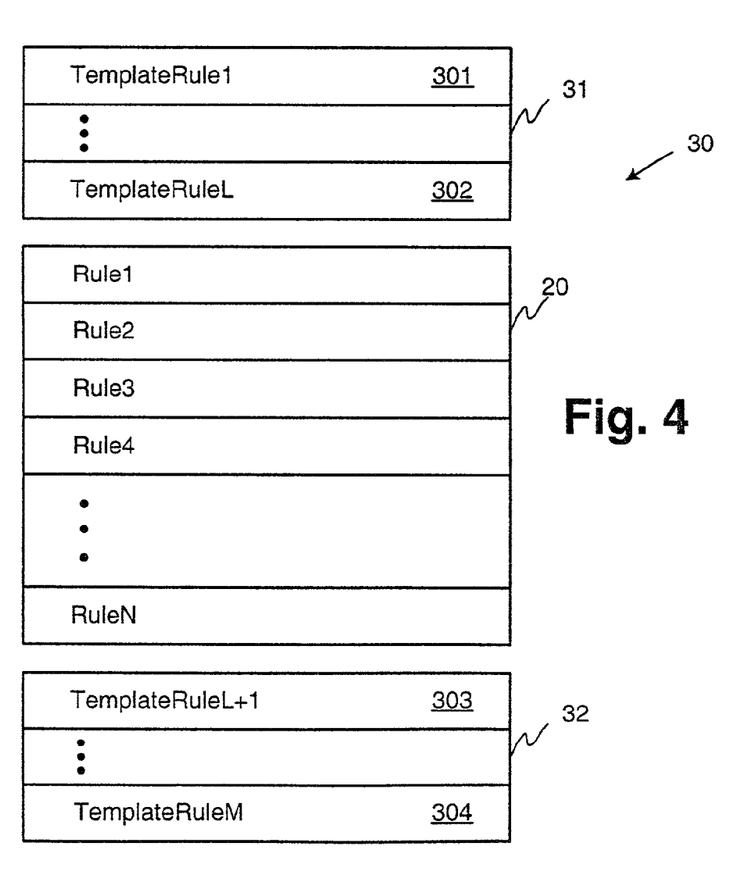
FIG. 4 illustrates a feature of screening information advantageously used in some embodiments of the invention.

FIG. 4 illustrates a feature of screening information advantageously used in some embodiments of the invention. In addition to an ordered set of rules 20, which is modifiable, the screening information 30 comprises a rule template 31, 32, whose modification is prevented except from authorized entities. For example, if the rule template is fetched from a database during configuration of a gateway elements it is possible that local modification of the rule template is completely prevented. Only an entity authorized to modify a rule template stored in the database may in this case modify the rule template. Alternately, it is possible that the modifiable part 20 of the screening information may be modified locally by a process or an entity having rights to perform the operation, but the rule template may be modified only by a root entity. In this way, the entity authorized to modify the rule template does not have to be bothered with all minor changes in the modifiable part of the rule file. As the rights to modify different sets of subrules may additionally be given to different entities, modifying the rules is flexible, but still only authorized entity may modify the most critical rules in the rule template.

As FIG. 4 illustrates, a rule template may comprise a first part 31, which has L rules from TemplateRule1 301 to TemplateRuleL 302, and a second part 32, which has M-L rules from TemplateRuleL+1 303 to TemplateRuleM 304. The number of rules (L or M) may be any integer. The first part 31 of the screening information precedes the modifiable part 20, and the second part 32 succeeds it. The modifiable part 20 may be placed after any TemplateRuleL, and the place for the modifiable part 20 is conveniently identified by stating that TemplateRuleL, for example, in screening information which is retrieved from a database.

As typically the most critical rules of screening information are at the beginning and/or in the end of screening information, a template of rules prevents unintentional modification of these most critical rules. The last rule in a prior-art ordered set of rules is typically of the following form: any, any, any, drop. When this rule is TemplateRuleM, it cannot be unintentionally modified.

Figure 5:
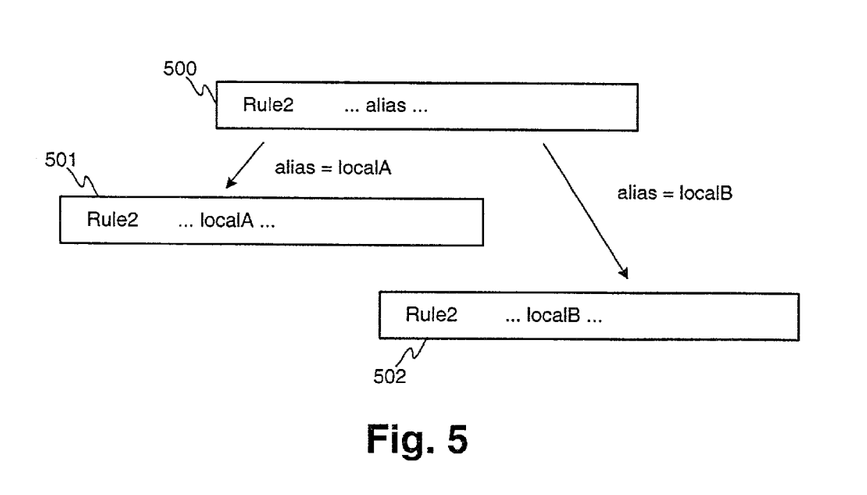
FIG. 5 illustrates a second feature of screening information advantageously used in some embodiments of the invention.

FIG. 5 illustrates a second feature of screening information advantageously used in some embodiments of the invention. This second feature is the use of generic information portions in screening information. This is especially advantageous, when screening information, typically rules, is stored in a database and fetched therefrom, for example, when a gateway element is configured. A generic information portion can represent any information portion in a rule, and it is replaced with local information before the rule is used. Such generic information portions are often called aliases. FIG. 5 presents an example, where rule 500 has—as part of the information specifying header information of a data packet, an alias. As the rule is, for example, fetched from a database when configuring a first gateway element connecting a local network A to a public network, the alias is replaced with information localA relating to the local network A (rule 501 in FIG. 5). Correspondingly, as a second gateway element connecting a local network B to a public network, is configured, the alias is replaced with information localB relating to the local network B (rule 502 in FIG. 5). In many cases, this replacement may be performed automatically; for example, by specifying in a configuration file the local information which is to replace certain generic information portions in screening information.

The use of generic information portions thus allows storing of screening information relating to a number of gateway elements to a database and easy configuring of those gateway elements. Furthermore, as it is possible to automatically update screening information locally stored in gateway elements after the screening information in database has been modified, the replacement of aliases with local information is advantageously carried out automatically as screening information is updated.

As an example of using generic information portions, some of which are replaced with information about the local network and others of which are replaced with information about a separate local network, consider rules stating that data packets between two local networks A and B are protected with processing them according to VPN instructions. In this case the rules may be of the following form. A first rule has two generic information portions and it reads: alias1, alias2, any, VPN. A second rule has the same two generic information portions, and it reads: alias2, alias1, any, VPN. In the gateway elements connecting the local networks A and B to a public network, alias1 may be replaced with local information (say, network A) and alias2 with information about the other network (network B).

Figure 6A:
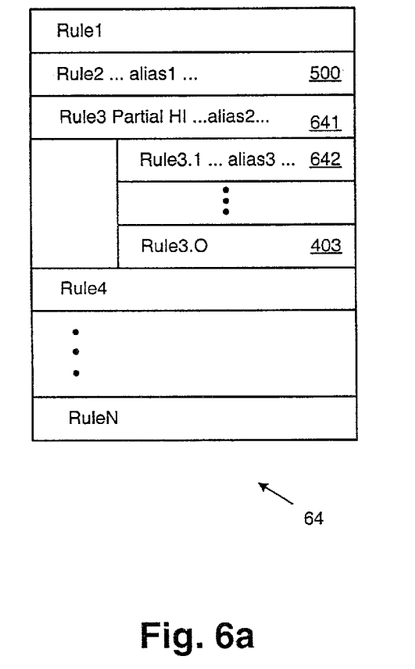
FIG. 6 illustrates further examples of screening information in accordance with the invention.
Figure 6B:
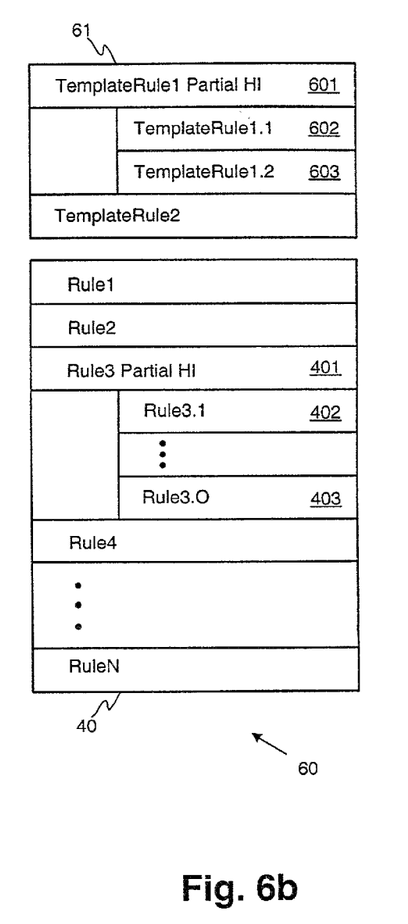

FIG. 6 illustrates further examples of screening information in accordance with the invention. FIG. 6a illustrates an example of screening information 64 involving hierarchical rules and generic information portions. Rule2 comprises a first generic information portion, alias1. The hierarchical rules 641 and 642 also comprise generic information portions. As an example, subrule 403 does not comprise generic information portions. FIG. 6b illustrates an example of screening information 60 involving rule template and hierarchical rules. The rule template 61 itself contains hierarchical rules 601, 602 and 603. Furthermore, the modifiable part 40 of the screening information also contains hierarchical rules 401, 402, 403.

Figure 6C:
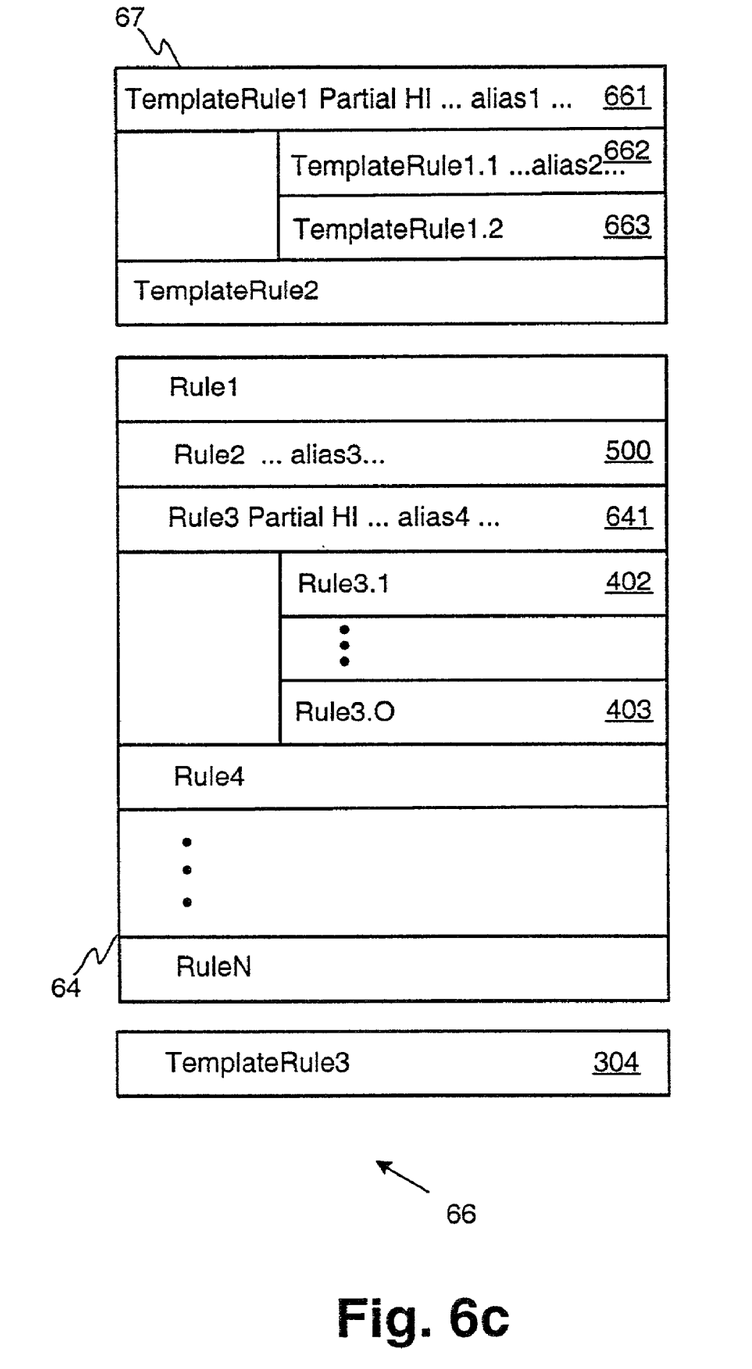

FIG. 6c illustrates an example of screening information 66 involving rule template, hierarchical rules and generic information portions. The first template part 67 comprises hierarchical rules 661, 662 and 663, which involve a first generic information portion (alias1) and a second generic information portion (alias2). In addition, the modifiable part 64 of the screening information comprises rule2 having a third generic information portion (alias3). Furthermore, the modifiable part 64 comprises hierarchical rules 641, 402 and 403. The rule 641 involves a fourth generic information portion (alias4).

Figure 7A:
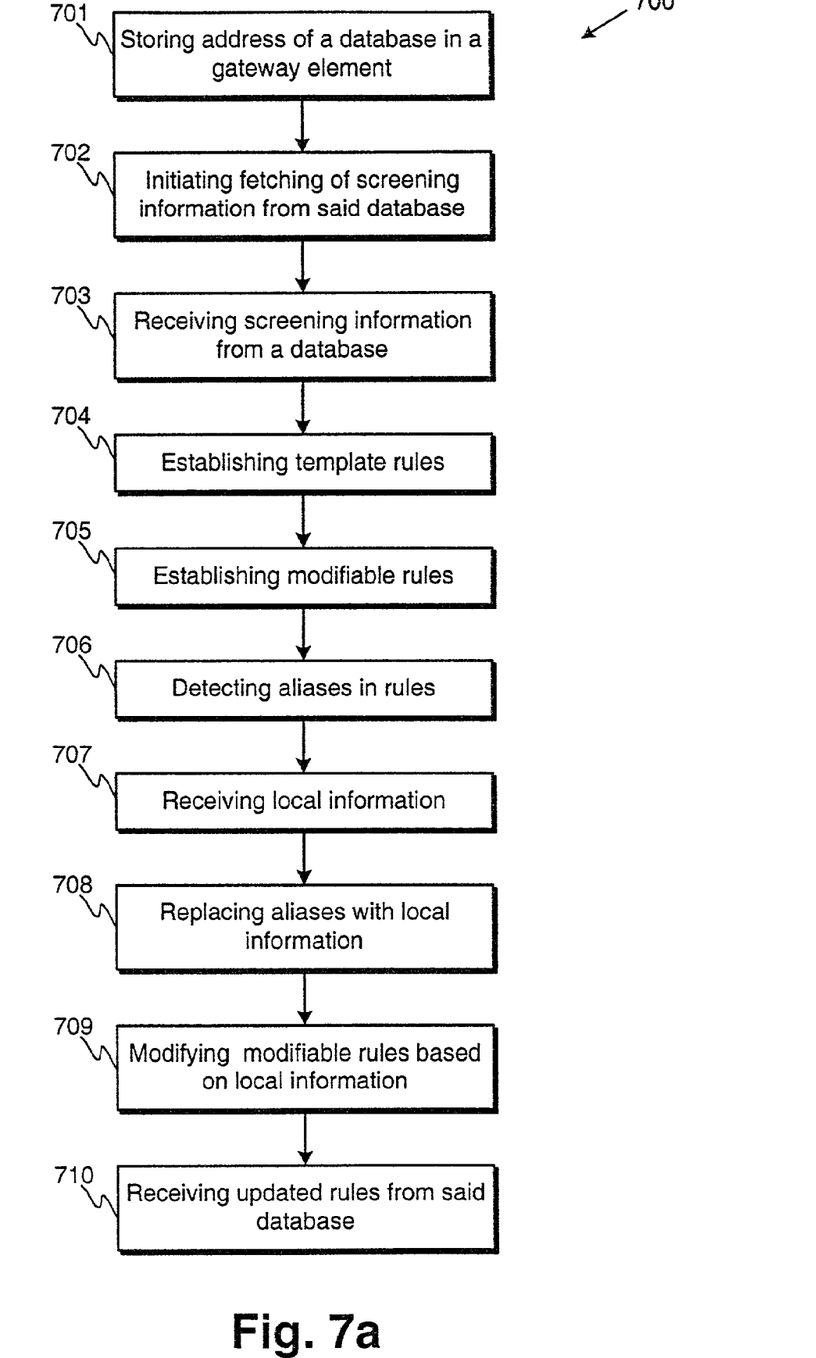
FIG. 7a illustrates an example of a method for providing screening information to a gateway element.

FIG. 7a illustrates an example of a method for providing screening information to a gateway element. In step 701, an address of a database is stored in a gateway element. In step 702, fetching of screening information from said database is initiated. In step 703 screening information is received from the database. Steps 702 and 703 are typically carried out, when the gateway element is configured. If the address of a database entity is stored in a gateway element, this initiation of fetching of screening information and said fetching may be performed automatically. This makes configuring of gateway elements easy and straightforward.

In step 704 template rules, if there are any, are established. The modification of template rules is typically at this step prevented from entities not entitled to modify them. In step 705 modifiable part of the screening information is established. In step 706 aliases in the screening information are detected. They may also be either template rules or modifiable rules. In step 707, typically if screening information comprises rules involving aliases, local information is received. It may be received, for example, in the form of a configuration file or fetched from the same or from another database. In step 708 aliases are replaced with local information. In step 709 the modifiable part of screening information is modified. This refers, for example, to a person modifying the modifiable rules during or after configuration of a gateway element. In step 710 updated rules are received from a database entity. This step typically involves also the replacement of aliases with local information, if the updated rules comprise aliases. Any part of the screening information may be hierarchically structured, in other words any part of the screening information may contain subrules.

Figure 7B:
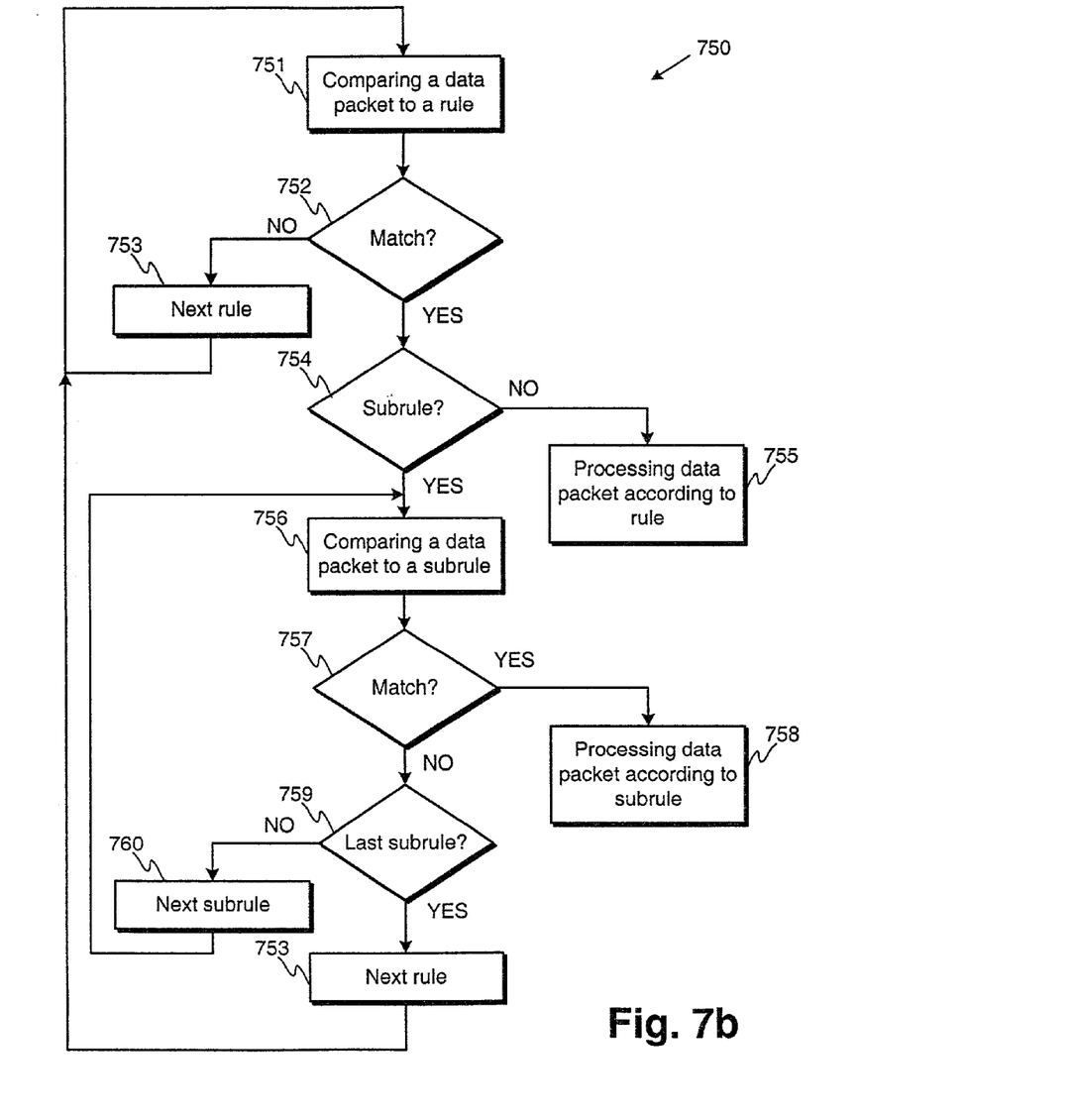
FIG. 7b illustrates an example of a method in accordance with the invention.

FIG. 7b illustrates an example of a method according to the invention for processing data packets. In this method 750, a data packet is compared to a rule in step 751. If the header information of the data packet does not match that of the rule (step 752), the data packet is compared to next rule (steps 753 and 751). If the data packet matches the header information of the current rule in step 752, it is checked if the current rule involves subrules (step 754). If the current rule has no subordinate rules, the data packet is processed according to the current rule in step 755. If there are subrules, the data packet is compared to a subrule in step 756. If the header information of the data packet matches that specified in the subrule (and, as checked before, that of the current rule), the data packet is processed according to the current subrule in step 758. If there is no match in step 757, it is checked if the current subrule is the last subrule relating to the current rule (step 759). If the current subrule is the last subrule, the data packet is compared to the next rule (steps 753 and 751), otherwise the data packet is compared to the next subrule (steps 760 and 756).

Figure 8:
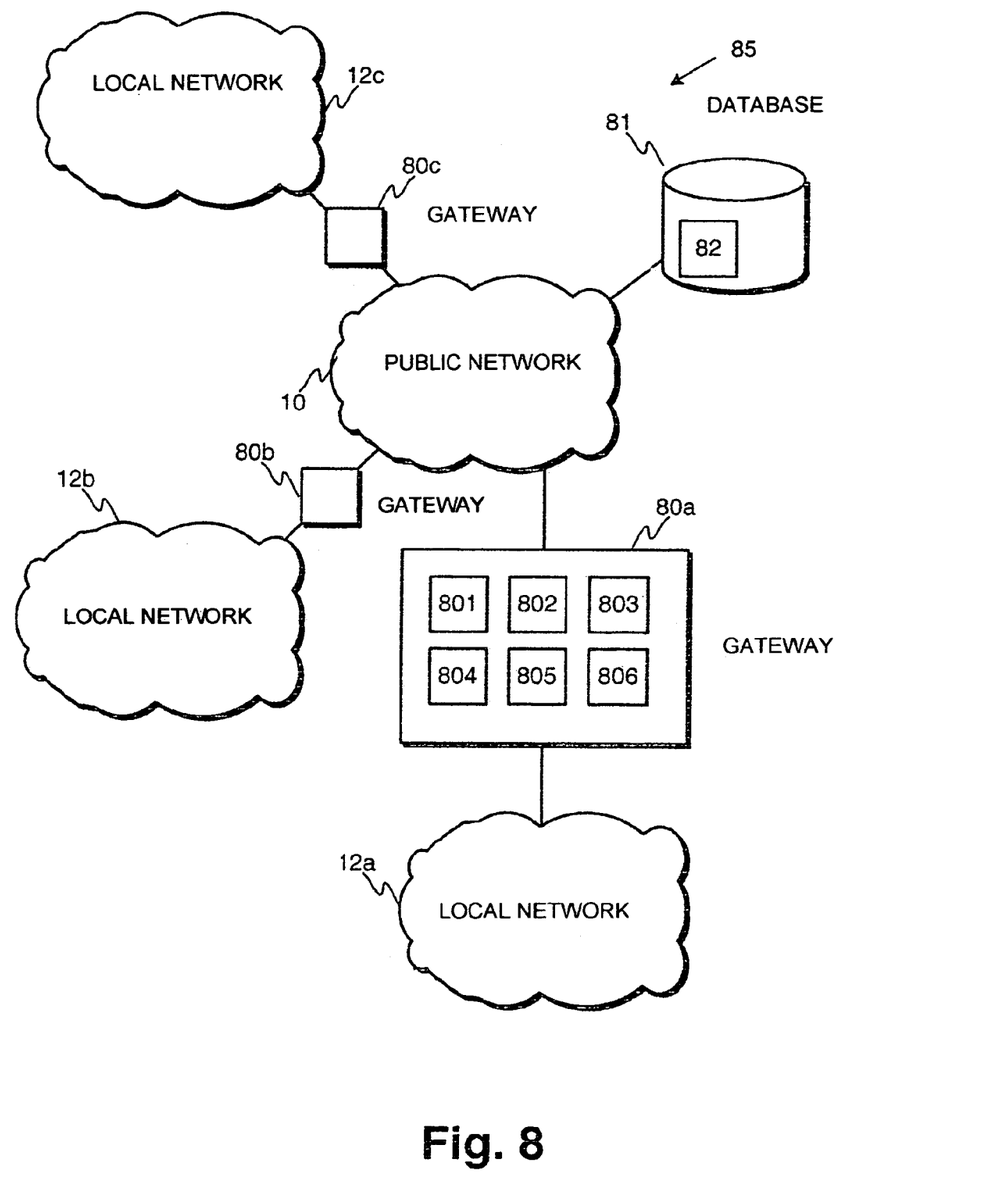
FIG. 8 illustrates an example of a gateway element and an arrangement in accordance with the invention.

FIG. 8 illustrates an example of a gateway element 80a and an arrangement 85 in accordance with the invention. A gateway element 80a comprises
  means 801 for storing said screening information, and
  means 802 for processing data packets, said processing comprising comparison of a data packet header to header information specified in said screening information, and it is characterized in that said means for processing data packets are arranged to compare header information of a data packet to screening information comprising a first rule, which specifies first header information, and a subset of rules relating to said first rule, and arrange to compare a data packet to said subset of rules only if the header information of the data packet matches the header information of the first rule.

A gateway element 80a may further comprise means 803 for detecting generic information portions in screening information, for receiving second information and for replacing generic information portions in said screening information with said second information. Alternatively or additionally it may further comprise means 804 for preventing modification of at least one rule belonging to said information. A gateway element 80a may further comprise means 805 for receiving at least part of said screening information from a database entity and, additionally, further means 806 for fetching at least part of said screening information from said database entity, said means for fetching being arranged to initiate fetching as part of configuration of said gateway element.

The means 802–806 are typically implemented as a suitable combination of hardware and software. They are advantageously implemented using software program code means executed by a processor unit. They may implement any of the methods described above or any of the features discussed in connection with FIGS. 3–7. The means 801 for storing information for screening data packets typically is a file on a disk.

An arrangement 85 comprises at least one gateway element 80a and a database entity 81. Said at least one gateway element 80a comprises means 801 for storing information for screening data packets and means 802 for processing data packets. The arrangement 85 is characterized in that
  said database entity 81 comprises means 82 for providing information for screening data packets, and
  said at least one gateway element 80a further comprises means 805 for receiving at least part of said information for screening data packets from said database entity, and said means 802 for processing data packets are arranged to compare header information of a data packet to screening information comprising a first rule, which specifies first header information, and a subset of rules relating to said first rule, and arranged to compare a data packet to said subset of rules only if the header information of the data packet matches the header information of the first rule.

The gateway element, which is part of the arrangement 85, may further comprise any of the above described means 803, 804 or 806.

The arrangement 85 in FIG. 8 comprises three gateway elements 80a, 80b and 80c. Typically screening information is stored in the database entity 81. The generic information portions, which the screening information stored in the database entity 81 typically comprises, are usually replaced with gateway-element-specific local information. This gateway-element-specific information may be stored in the database entity 81 and fetched from there, for example, when configuring the gateway elements.

What is claimed is:

1. An arrangement including at least one gateway element and a database entity, said at least one gateway element comprising
  means storing information for screening data packets and
  means processing data packets, said processing involving comparison of a data packet header to header information specified in said screening information,
  said database entity including means providing information for screening data packets,
  said at least one gateway element including means receiving at least part of said information for screening data packets from said database entity, and said processing means being configured to compare header information of a data packet to screening information comprising a first rule, which specifies first header information, and a subset of rules relating to said first rule, and configured to compare a data packet to said subset of rules only if the header information of the data packet matches the header information of the first rule, and wherein said screening information comprises a first part, which is modifiable by an entity authorized to configure said gateway element, and a second part, which is modifiable by an entity specifically authorized to modify said second part.

2. A computer readable storage medium comprising a computer executable program code which provides at least following functions of a gateway element:

storing information for screening data packets, processing data packets, said processing involving comparison of a data packet header to header information specified in said screening information, receiving at least part of said information for screening data packets from a database entity providing information for screening data packets, and said comparing involving comparing header information of a data packet to screening information comprising a first rule, which specifies first header information, and a subset of rules relating to said first rule, and configured to compare a data packet to said subset of rules only if the header information of the data packet matches the header information of the first rule, and wherein said screening information comprises a first part, which is modifiable by an entity authorized to configure said gateway element, and a second part, which is modifiable by an entity specifically authorized to modify said second part.

3. A computer-implemented method for processing data packets in a gateway element, said method comprising:

storing information for screening data packets and processing data packets, said processing involving comparison of a data packet header to header information specified in said screening information, receiving at least part of said information for screening data packets from a database entity providing information for screening data packets, and said comparing involving comparing header information of a data packet to screening information comprising a first rule, which specifies first header information, and a subset of rules relating to said first rule, and configured to compare a data packet to said subset of rules only if the header information of the data packet matches the header information of the first rule, and wherein said screening information comprises a first part, which is modifiable by an entity authorized to configure said gateway element, and a second part, which is modifiable by an entity specifically authorized to modify said second part.

* * * * *